United States Patent
Azarko

(10) Patent No.: US 11,691,594 B2
(45) Date of Patent: Jul. 4, 2023

(54) AUTOMOTIVE AUTHORIZATION CONTROL

(71) Applicant: VAIS Technology LTD, Englewood, CO (US)

(72) Inventor: Vladimir Azarko, Castle Rock, CO (US)

(73) Assignee: VAIS TECHNOLOGY LTD, Englewood, CO (US)

( * ) Notice: Subject to any disclaimer, the term of this patent is extended or adjusted under 35 U.S.C. 154(b) by 156 days.

(21) Appl. No.: 17/083,243

(22) Filed: Oct. 28, 2020

(65) Prior Publication Data

US 2021/0122333 A1    Apr. 29, 2021

Related U.S. Application Data

(60) Provisional application No. 62/927,586, filed on Oct. 29, 2019.

(51) Int. Cl.
*B60R 25/20* (2013.01)
*G07C 9/00* (2020.01)
*B60R 25/24* (2013.01)

(52) U.S. Cl.
CPC .......... *B60R 25/2054* (2013.01); *B60R 25/24* (2013.01); *G07C 9/00896* (2013.01); *G07C 2009/00928* (2013.01)

(58) Field of Classification Search
None
See application file for complete search history.

(56) References Cited

U.S. PATENT DOCUMENTS

| | | | |
|---|---|---|---|
| 5,973,611 A | * | 10/1999 | Kulha .................. B60R 25/245 340/426.36 |
| 6,034,617 A | | 3/2000 | Luebke |
| 6,437,683 B1 | | 8/2002 | Wolf |
| 7,388,466 B2 | | 6/2008 | Ghabra |

(Continued)

*Primary Examiner* — K. Wong
(74) *Attorney, Agent, or Firm* — Kyle W. Rost

(57) ABSTRACT

An authorization controller on a first side of a two-sided system communicates with an accelerometer on the second side for tracking the second side by inertial navigation. The authorization controller activates a radar transmitter and receiver installed on a car to include a plurality of spaced apart transmitting and receiving radar antennas to track the second side by radar. Coherent pulse or Doppler radar waveform tracks motion of an approaching user carrying a tag on the second side that is paired with the car on the first side. The authorization controller uses the radar to look for a pre-programmed pattern of user movement such as a "step in, wait, step out" pattern. Recognition of the programmed pattern activates an associated action from the authorization controller, such as opening or closing a tailgate or side door of the car. The same radar technology can be used with different programmed movement patterns to trigger the opening or closing of side doors, opening/closing of regular doors, deployment of a handicap ramp, deployment of side steps, or other chosen functions that can be initiated by electronic response. Reversing this functionality, the tag may be stationary in a garage and the car may approach the garage, causing operation of the garage door. Other functions inside a house are similarly controlled.

12 Claims, 2 Drawing Sheets

(56) References Cited

U.S. PATENT DOCUMENTS

| | | | |
|---|---|---|---|
| 8,091,280 B2 | 1/2012 | Hanzel | |
| 8,319,605 B2 | 11/2012 | Hassan | |
| 8,525,672 B2 | 9/2013 | Moser | |
| 9,396,597 B2 * | 7/2016 | Yamane | G07C 9/00309 |
| 10,328,900 B1 * | 6/2019 | Yakovenko | B60R 25/24 |
| 10,464,528 B2 * | 11/2019 | Jun | B60R 25/246 |
| 10,576,932 B2 | 3/2020 | Yakovenko | |
| 10,846,960 B1 * | 11/2020 | Lemberger | H04N 7/183 |
| 2013/0249669 A1 | 9/2013 | Zwiener | |
| 2015/0116085 A1 | 4/2015 | Juzswik | |
| 2017/0369034 A1 * | 12/2017 | Bilik | G01S 7/006 |

* cited by examiner

AUTOMOTIVE AUTHORIZATION CONTROL

BACKGROUND OF THE INVENTION

Field of the Invention

The invention generally relates to electrical communications and to selective electrical communication. More specifically, the invention relates to intelligence comparison for controlling electrical communication and to authorization control, regarding entry into an area, where an access barrier exists. The access barrier can be a vehicle door, which in addition to the conventional doors of a car, may refer to a trunk lid, tailgate, liftgate, or fifth door. The authorization control may relate to coded record input, such as an IC card or key, and to a wireless transceiver. The invention is the accessible placement of a device providing authorization control, with integration into a vehicle feature at such accessible location that is otherwise purposed, to establish significantly improved access to the authorization control device. Further, the invention is the adaptation of an otherwise purposed vehicle feature to additionally serve as an authorization control device so as to bring access to such authorization control device to the user without requiring special dexterity of the user to interact with the device.

Description of Related Art

Various techniques allow keyless entry into a vehicle. A basic system provides a key fob to the user, and a manual action such as a button press on the key fob transmits a signal to the vehicle, causing a door or liftgate to unlock or physically move to an opened position. Another system that is referred to as hands-free is more sophisticated and operates on a two part basis, detecting both presence and response. Presence detection is the sensing an approach, often employing a radio frequency emitter such as a smart key or go key, into near proximity to the vehicle. The proximity detection does not require a manual button press. This technique has been applied to a vehicle liftgate as the first step of permitting hands-free entry, which can be especially useful when the user's hands are occupied with a load to be placed in the vehicle. However, proximity by itself is not a generally suitable sole criterion for automatically opening a liftgate, because the need to load the vehicle can be infrequent.

The second step in causing a liftgate to open is response. The user can be required to employ a detectable response in order to control the lifting of a liftgate, and the vehicle can be equipped with a suitable response detector that opens the liftgate when both presence and response have been detected. One known response is for the user to raise his foot in a kick action under the rear of the vehicle, where a proximity sensor on the vehicle senses the kick and then triggers the liftgate to open. U.S. Pat. No. 8,091,280 to Hanzel et al describes various types of response detectors, including audio, optical, touch, ultra sonic, and laser.

The response of kicking below the rear of a car is used commercially. At least one brand of vehicle employs the kick response to signal the vehicle to open a liftgate. This response is accompanied by practical problems. One such problem is that a user with loaded arms may find difficulty in also standing on one foot to perform the kick motion. Another problem is that every user may execute the kick differently, such that the detection system may misinterpret some user's action. Still another problem is that the sensor, being located under the car, might malfunction when covered by normal road and weather contaminants such as mud or snow.

At least one major automaker has chosen the kick motion as the necessary response, but the automobile industry has considered other types of responses, as well. United States Patent Application Publication 2013/0249669 to Zwiener proposes that a presence detection step can involve recognition of the user by means of facial features or voice recognition. A user can cause a liftgate to open by performing any prearranged response, such as by stamping his foot or walking to a particular location. While these forms of recognition and response are technologically advanced, there is no assurance that they are reliable or desirable. For example, they present a clear problem if they deny functionality to a guest passenger whose face is not yet entered into the recognition system. Another problem might arise in a noisy area where voice recognition is difficult, or the user's action of going to a certain location might be misinterpreted.

United States Patent Application Publication 2015/0116085 to Juzswik proposes an even more automated system for opening a door or liftgate. A key fob or go key system communicates over a radio frequency with the vehicle to show that an authorized person is in the vicinity of the vehicle. Then, the vehicle allows a predetermined time interval to pass, after which the vehicle issues a perceptible warning and causes the door or liftgate to open without requiring further response from the user, other than his remaining in the vicinity. This high degree of automation appears excessive in many situations, such as where the user has any of countless other reasons for remaining near his car.

Capacitive sensing is a method of detecting the change of capacitance on a sensor due to the user's touch. A capacitive touch system can provide an interface or button for opening a liftgate in response to touch. Capacitive sensing employs a conductive or metal sensor pad, which usually is a metal-fill area placed on a printed circuit board (PCB) and connected by traces to a microcontroller that monitors capacitance of the sensor pad. As the environment changes around the sensor, the capacitance of the conductive material relative to ground will change. The sensor pad serves as one plate of a capacitor. The remainder of the interface or button is variable in design.

In one type of design, a conductive target or metal cover is suspended over the sensor, providing the second conductive surface for the sensor capacitor. A fascia or top surface can be applied over the target. A spacer between the PCB and the target establishes a space between the sensor and the target. When a user pushes the target toward the sensor, much like pushing a button, the spacing changes between the target and the sensor and produces a detectable change in the sensor capacitance. The suitably programmed microcontroller continuously reads the capacitance of the sensor and measures the change in capacitance. Upon detecting a significant change, the system triggers the opening of a liftgate.

In another type of capacitive touch sensor design, an overlay is adhered to the top of the sensor pad. The overlay typically is nonconductive. Glass and plastic materials are suitable. The user's finger is applied to the top of the overlay, which changes the capacitance of the sensor pad. The microcontroller detects the shift in capacitance.

Another available technology for automatically opening a liftgate is capacitive proximity detection. This technique offers a suitable interaction with the user without having physical contact. Capacitive proximity sensing is a method of detecting the change of capacitance on a sensor due to the user's proximity. Various chip makers offer a suitably programmed microcontroller solution for monitoring the capacitance of a sensor and watching for a significant change. A signal shift due to proximity will be significantly smaller than a touch signal because it must work over long distances and through air, rather than through a plastic or glass target or fascia.

Capacitive proximity sensing employs a sensor, which usually is a metal-fill area placed on a printed circuit board. Conventionally, a front panel overlies the exposed face of the sensor and PCB. The sensor acts as one plate of a capacitor. A second side of the capacitor is ground, which may be a ground plane or a ground trace on the printed circuit board.

A number of considerations can affect the operation of a capacitive proximity sensor when mounted on a metal vehicle. If a ground plane or other metal surface is directly adjacent to the sensor, it will result in decreased range of proximity detection. In free space, a sensor emits its electric field in all directions with little attenuation. If a ground plane is placed between the sensor and an approaching object, such a ground plane effectively reduces the detection range of the sensor and blocks the sensor from seeing the approaching object. The electric field lines from the sensor tend to terminate on the ground plane, such that the strength of the radiating field decreases as the distance between the ground and the sensor decreases. When a ground plane is directly adjacent to the sensor, range and sensitivity are decreased due to an increase in base capacitance.

A capacitive proximity detection system operates to detect an approaching or proximate user. The system scans the sensor and detects changes in capacitance. The human body is strongly coupled to the earth ground. In systems that employ earth ground on one side of the capacitor, the detection distance is large. When the user gets close to the sensor, the coupling between the sensor and the surrounding ground plane is strong and the system has maximum sensitivity. In systems that are battery-powered, both the sensing system and the human body have coupling capacitance to earth ground, and the human body usually can add more coupling between the system and earth ground. For the system to have good sensitivity for the proximity sensor, the system and the human body should have a good coupling.

While capacitive proximity sensing is applied to systems for hands-free entry into a vehicle, it would be desirable to apply hands free systems in a way that responds to the user's clearly expressed intention while requiring no special dexterity of the user.

It would be desirable to improve location and detection ability of a sensing system suited for use on cars or other vehicles that must carry parts of a sensing system. Toward this goal, an aspect of the present invention is to adapt an improved electromagnetic sensing system to perform locating and detection ability of a sensing system. In part, an object of the invention is to adapt a sensing system for improved functionality provided by use of radar. While radar is used for a variety of civilian and military purposes, none are similar to a sensing system controlling vehicle entry and starting, particularly a land vehicle, and more particularly an automobile. Among military applications of radar, uses include weather avoidance, navigation and tracking, search and surveillance, high resolution imaging and mapping, proximity fuses, and countermeasures. Civilian applications are similar and additionally include space flight and sounding.

Radar typically employs certain middle frequencies within the electromagnetic spectrum, which generally include wavelengths ranging from high frequency to low frequency. At the high frequency end of the spectrum are frequency bands commonly referred to as ultraviolet, visible, and infrared. At the low frequency end of the spectrum are bands commonly referred to as LF and MF plus a portion of the radio band. Between the high and low frequency bands are radar frequencies, which fall into millimeter, microwave, and a portion of the radio band. Radar can be further classified by waveform, where the radar is either continuous wave of pulsed wave. Of the pulsed wave, the radar is either noncoherent or coherent, and coherent radar can be classified by pulse repetition frequency (PRO, which may be low, medium, or high. Low PRF and lower medium PRF are moving target indicator (MTI) radar. Higher medium PRF and high PRF are pulse Doppler radar. In practice multiple pulses are transmitted to cover search patterns, track moving targets, and integrate several target returns to improve detection. Targets in motion relative to the radar cause the return signal frequency to be shifted. A Doppler shift occurs when the relative velocity vector has a radial component. In general there will be both radial and tangential components to the velocity. The Doppler shift enables determination of whether a target is closing or receding.

Radar systems employ a transmitter and a receiver that may be deployed in several arrangements of antennas. Bistatic radar systems employ separate transmit and receive antennas, taken from the viewpoint of a target. In monostatic radar systems, the transmitter and receiver are co-located as viewed from the target. In quasi-monostatic systems, transmit and receive antennas are slightly separated but still appear to be at the same location as viewed from the target.

Radar frequencies are useful for normal functions of determining range from pulse delay, determining velocity from Doppler pulse delay, and determining angular direction from antenna pointing. Target range is the fundamental quantity measured by most radars. It is obtained by recording the round trip travel time of a pulse and computing range. Signature analysis and inverse scattering enable further radar functions of determining target size from magnitude of return, determining target shape and components from return as a function of direction, and determining moving parts as a modulation of the return, and determining material composition.

Early turn-key passive entry/passive start (PEPS) systems provided car access functions with remote keyless entry, passive entry (PE), passive start (PS) and passive lock (PL). Such configuration employed a learning procedure for pairing a vehicle with a key fob, using RKE rolling code synchronization, and using end-of-line parameters compensation (RSSI). Such systems used orientation-independent low frequency (LF) wake-up functionality. Such systems provided key localization and one- or two-way radio frequency (RF) communication. They included immobilizer LF communication according to an open immobilizer protocol and keyless entry functions with a secure rolling-code protocol. All functions needed for uni- and bi-directional authentication, key fob localization, and field supply were implemented by software.

The PEPS system could employ vehicle LF antennas to detect the key fob location and determine if the key fob is inside or outside the vehicle cabin. According to such PEPS systems, when the driver possessing a key fob approached the vehicle, a secure wireless communication between the key fob and a vehicle control unit authenticated the fob. Bi-directional wireless communication authenticated the key fob and the vehicle in both one-way and two-way systems. In one-way RF systems a downlink served to wake up the key and to receive commands as well as data for the authentication process. The fob then sent the response to the vehicle via RF uplink. In two-way RF systems the LF downlink only serves to wake up the key fob and to establish the RF up-/downlink. The bi-directional RF link handles the entire communication during the authentication process. Vehicle LF antennas detect the key fob location and determine if the key fob is inside or outside the vehicle cabin. The system is flexible. You can adapt the position and the number of antennas to any type of vehicle.

According to the passive entry (PE) function, the driver is allowed to unlock the vehicle's doors without activating the key fob. However, some user action is needed to trigger the system such as approaching the car door, or touching or pulling on the door handle. When the vehicle detects such an activity, it starts to search for the key fob outside the vehicle cabin. This is called localization. Once the fob has been authenticated, the doors unlock automatically.

According to a passive start (PS) function, the driver is allowed to start or stop the vehicle engine without activating the key fob. Replacing the lock cylinder, a start/stop engine button in the vehicle cabin activates the PS function. Once the driver pushes the start/stop button, the vehicle starts to localize the key fob inside the car. The communication between vehicle and fob is almost identical to PE systems, except that PE systems search for fobs outside the vehicle, whereas PS systems search for fobs within the vehicle cabin. If at least one paired key fob is localized inside the vehicle cabin, and has been successfully authenticated, the start/stop engine button starts or stops the engine.

According to a passive lock function, the driver is allowed to lock the vehicle doors without activating the key fob. A lock button or a sensor on the door handles eliminates the need for key fob manipulation. The driver only needs to push this button or touch the handle to lock or unlock the doors. The vehicle system starts automatically to search the key fob outside and inside the car, and initiates key fob authentication. If at least one key fob was authenticated and localized outside the cabin and no paired key fob was authenticated and localized inside the cabin, the vehicle locks its doors. Instead of keeping the doors unlocked if keys were detected inside the cabin, it was possible to blacklist those inside keys and disable them for the next passive entry request.

In the PEPS system, a key fob wake up system was employed in a hands-free passive system, where the key never knew in advance when a communication sequence required the system controller to actively respond to a request. If a PEPS system included a master control unit (MCU) to wake-up the key fob and such an MCU was permanently active, the MCU would be a large drain on the car battery and would reduce battery lifetime. To overcome this battery drainage problem, the MCU was placed in sleep mode until a wake-up occurred. A highly sensitive 3-axis LF amplifier with a low-power listening mode constantly checked for a valid LF signal. Once it received a valid LF signal containing the correct vehicle-specific wake-up ID, it generated a signal to wake up the PEPS MCU controller.

The known PEPS system communicated bidirectionally via three different communication channels: Bidirectional, short-range (4 to 5 cm) LF communication; Unidirectional, medium-range (about 2 to 3 m) 3D-LF communication; and Long-range (10 to 30 m) RF communication, both one and two-way RF.

It would be desirable to create an automotive authorization control system with expanded and improved functionality as compared to the known PEPS system and with expanded range and improved sensing over capacitive systems.

It would be desirable to apply hands free systems in a way that responds to the user's clearly expressed intention while requiting no special dexterity of the user.

It would be desirable to develop a passive entry/passive start system with improved localization. The prior known system detected if the key was near the vehicle, and, depending whether the system was a PE or PS system, whether the key was inside or outside the vehicle. In such prior system, a car typically had four to six LF antennas. These produced an LF magnetic field covering both the car interior and the car's vicinity. The key fob measured the LF signal level during communication with the vehicle, acquired the RSSI, and sent it back to the vehicle, which analyzed the RSSI to determine the fob's position. As the spatial orientation of the key fob was unknown, the key fob used three discrete antenna coils or one 3D-coil to determine the x-, y- and z-axes. The RSSI measurement accuracy depended on the hardware device and on the precise calibration of all key fobs during end-of-line manufacturing.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a hands-free entry system for a vehicle, where the installed system is substantially undetectable to the observer, such that the system is suited for both original manufacture of the vehicle or aftermarket addition to the vehicle.

Another object is to provide a hands-free entry system for a vehicle, where substantially any user can actuate the system without having special dexterity, but unintended actuation is avoided.

Another object is to provide pre-programmed and user customized electronic accessory triggering.

According to the invention, a two-sided system triggers a selected functionality in a piece of operable equipment responsive to such triggering. The first side of the two-sided system is a base station with an electronic control unit (ECU) and optionally an authorization controller, where not otherwise available, installed in proximity to the operable equipment. The second side of the two-sided system is a mobile tag or fob to be carried by a driver or other user of the operable equipment and capable of bidirectional communication with the first side of the two-sided system. The first side of the two-sided system is connectable to the piece of operable equipment to trigger the selected functionality when the first side detects that a monitored target has met the triggering criteria. Each side of the two-sided system includes one or more receivers and transmitters that communicate over given frequency bandwidths when the ECU and tag are within a mutual recognition zone. The ECU sends a wake-up signal into the zone, where the fob receives it upon entering the zone. The LF signal decays quickly over distance, and the fob detects the received LF signal strength and under software control a processor in the fob determines distance of the fob from the base station based on the detected decay. The fob returns this data to the base station using a higher frequency such as radio frequency (RF). The ECU has a memory record of known triggering criteria and the selected functionality. The ECU has a processor that uses the distance data to determine whether a triggering criteria has been met, and if so, to send a signal for carrying out the selected functionality of the operable equipment. The chosen functionality is user selectable based on prior choices programmed into the ECU.

The recognition zone is the distance at which the two sides are close enough that they can be authenticated by communications between the fob and the ECU. Once authenticated, the first side enters into a triggering mode, where the first side of the two-sided system recognizes a known criteria or triggering pattern performed at a second side of the two sided system.

In the triggering mode, the ECU optionally activates a radar transmitter and a radar receiver monitoring for performance of the triggering pattern, which is a pattern formed of selective detectable events chosen among relative directional movement and proximity of the tag. A plurality of radar reception antennas is located at spaced apart positions and is responsive to the radar transmitter and receiver to communicate with the first side of the two-sided system. The first side of the two-sided system is connected to the piece of operable equipment to trigger the selected functionality when the authorization controller detects the tag has performed the triggering pattern. According to another aspect of the invention, a two-sided system triggers a selected functionality in a piece of operable equipment when monitoring a mutual recognition zone of the two sides. The two-sided system detects and monitors a target in the mutual recognition zone. A first side of the two-sided system recognizes a known triggering pattern performed by the monitored target. The first side of the system has an electronic control unit (ECU) mountable to the piece of operable equipment, and the first side of the system further has a memory with a record of the known triggering pattern and selected functionality associated with the known triggering pattern. The second side of the system has a mobile tag detectable by the ECU to be in the mutual recognition zone. The ECU includes a transmitter for broadcasting a wake-up signal for receipt by the mobile tag when the ECU detects the mobile tag within the mutual recognition zone, allowing recognition between the tag and the ECU. The mobile tag has a receiver for receiving the wake-up signal, and the mobile tag wakes-up in response thereto, and the mobile tag has a transmitter for communicating the wake-up to the ECU.

An accelerometer is activated after the ECU detects the mobile tag within the mutual recognition zone. The accelerometer employs inertial navigation to determine inertial navigation data of at least position, orientation, and velocity of the monitored target in the mutual recognition zone and communicates the inertial navigation data to the ECU. The ECU has a receiver for receiving the inertial navigation data, and the ECU further has an ECU processor communicating with the memory for receiving the known triggering pattern and determining when the inertia navigation data shows that the monitored target has performed the known triggering pattern. In response thereto, the ECU then issues a triggering signal. The first side of the two-sided system is connectable to the piece of operable equipment such that the triggering signal triggers the selected functionality.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
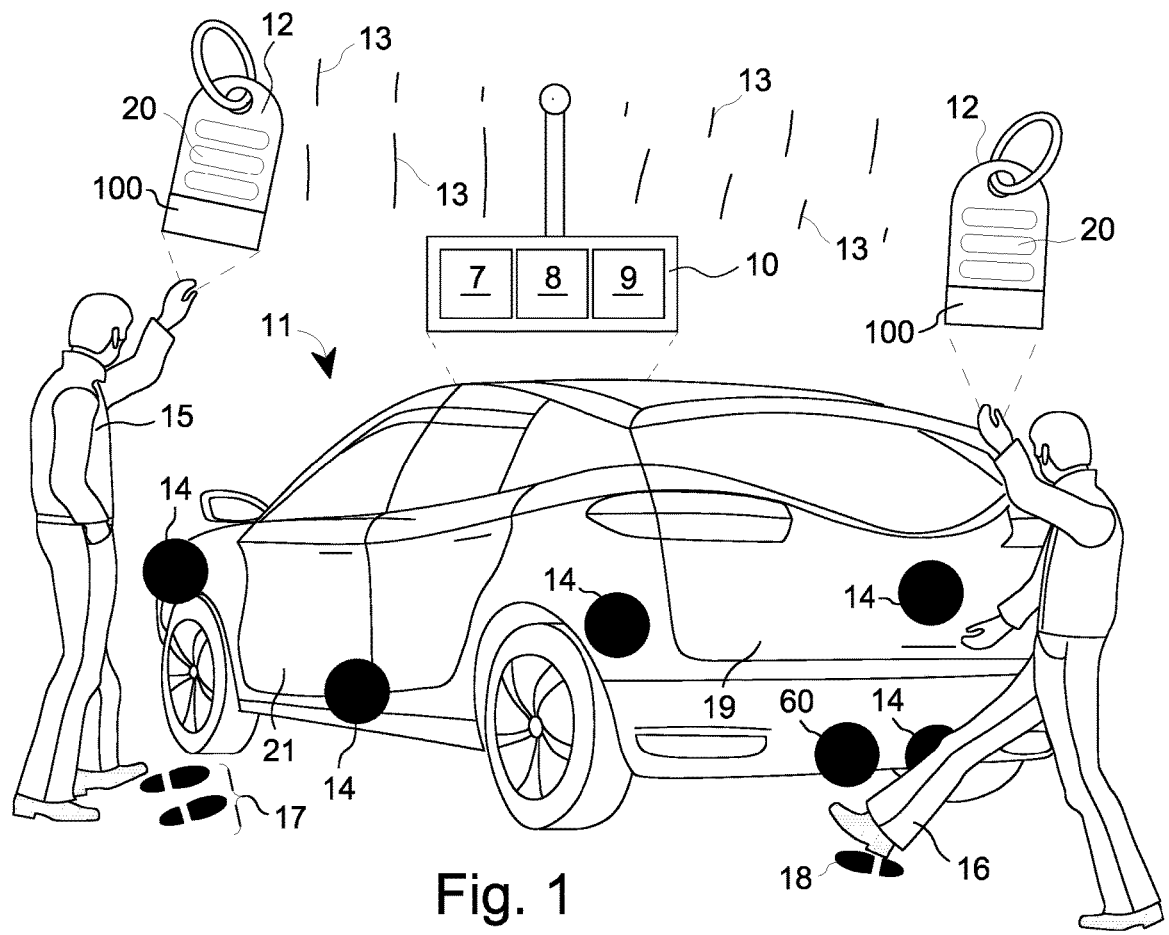
FIG. 1 is a perspective view of a representative car, showing target users and enlarged views of key fob communications, with schematic additions.

With reference to the drawings, the invention is a two-sided detection and actuation system primarily suited to numerous functions related to a piece of operable equipment such as a land vehicle or its surroundings or controlled using a control system operated by or through the land vehicle. In another aspect, the invention employs an electronic control unit (ECU) 7 that may be a part of base unit 10 that typically is installed in a land vehicle of which a car 11 is representative and is powered through the land vehicle's battery. The base unit 10 is installed with available communication with the vehicle network to directly communicate with components of the vehicle so that functionality of various components can be carried out by signals from the base unit. The invention also employs a mobile key fob or tag 12 that is linked by wireless communication 13 to the ECU and typically is carried by a driver or user of the car. A tag is similar to a fob but better distinguishes that a car key need not be attached to it. The purpose of the invention is to improve operation of the functionality of the operative equipment, such as where the operative equipment is a vehicle such as a car, opening a car door or tailgate, to carrying out still other electronic activations or responses.

An optional authorization control can be part of a two-sided system that detects and responds to physical proximity of the two sides. As a common example, some vehicles have an authorization controller within a factory-supplied vehicle network and do not require another one in an after-market base station.

One side of the two-sided system has the ECU 7 that initially will recognize the second side, which is the key fob or tag 12, when the tag comes within a recognition zone of the two-sided system. Conventionally, first communication 13 can be a low energy, low frequency (LF) signal generated from an LF transmitter in the ECU and sent as a monitoring frequency to detect such approaches and wake-up the tag when it enters the mutual recognition zone. The tag has an LF receiver for receiving the LF signal from the ECU when the tag is within the recognition zone. The tag 12 also is equipped with a receiver and transmitter operable at a higher frequency such a radio frequency (RF). The ECU also is equipped with a receiver and transmitter operable at the higher frequency, which for purposes of this description and not limitation will be called RF. After initially recognizing the tag to be in the recognition zone, the ECU 7 and tag 12 exchange data and commands over RF frequencies to perform authentication of the tag and vehicle. For efficiency of power usage, tag 12 is in a sleep mode before it enters the recognition zone. The ECU 7 uses the initial LF signal through the point of waking-up the tag due to the low energy requirements of RF signals.

LF signals have characteristic decay of the LF signals over short range transmission. When the tag 12 has received the LF signal, the tag is able to analyze the degree of decay in the LF signal and corresponding distance between the ECU and tag, using RSSI or time-of-flight (ToF) data and an on-board processor. The degree of decay can be converted into a readout of distance traveled, indicating the distance between the tag and the ECU. This distance is transmitted back to the ECU for use in determining whether the distance corresponds to triggering criteria for carrying out a functionality. The first side further has an ECU processor communicating and a memory containing a triggering pattern with corresponding functionality. The ECU processor communicates with the ECU and memory for determining whether the determined distance is a known triggering pattern, and if so, what functionality is to be performed. Depending upon the functionality to be performed, the ECU can await any closeness of the approaching tag before initiating monitoring of the mutual recognition zone.

The tag 12 receives the LF signal and enters the wake-up mode, after which the approach is handled at the indicated higher frequency communication transmitted and received between the first and second sides for carrying out transactions associated with the approach. Once in wake-up mode, the tag communicates with the ECU over the higher frequency, which typically is in a range from 315 MHz to 2.4 GHz. As a security measure, the ECU 7 and tag 12 take an additional precaution to authenticate the tag to the vehicle, or to authenticate the vehicle to the tag, or to authenticate each to the other. Such authentication is carried out by an authentication controller 8, which may or may not be part of the base station. Authentication can be by one side sending a challenge to the other, to which the other must correctly respond. A bidirectional transmitting and receiving antenna 60 on car 11 enables communication with a remote tag.

After authentication of the tag, the ECU 7 or other component of the first side will enter a pre-programmed accessory triggering mode. A variety of functionalities might he addressed by a unique trigger. Examples are to trigger a door to lock, trigger a door to unlock, or trigger for lighting to turn on or off. In addition, programming can provide other, user selectable triggering criteria to customize performance of other functionalities. Triggering criteria can be a simple or complex list of detectable events such as selective detections of distance, tag movement, and proximity. A variety of data can be referenced in a triggering pattern. Some data is learned by detecting signals 13 at the ECU from the tag.

An accelerometer 100 or like motion sensor can he incorporated into a tag 12 or base station 10 to determine precise direction, location, and general movement of a user or even another target in the mutual recognition zone or around the vehicle. The two-sided system enables unique detection by inclusion of the accelerometer 100, which allows inertial navigation to determine position, orientation, velocity, and several other beneficial results. If the accelerometer 100 is positioned on the tag, it benefits from power management because the tag is turned off to sleep mode when not in use. This positioning also aids security because the accelerometer 100 cannot be broken into as a step toward car theft while the tag is turned off. Combining results of LF decay with inertial navigation produces significantly advanced location accuracy, as well as determination of movement direction and relative speed. It becomes possible to see the approach or departure of a tracked target, or even which direction the target faces. Notably, it is not necessary for a tracked target to be carrying the tag. Other data is derived from the typical factory installed vehicle network of the car. Customization can be based on the proximity to the vehicle of a target such as a user 15, 16, vehicle status (moving, parked, running, door status), speed, and any other status the ECU 7 receives from the factory vehicle network. Inertial navigation using an accelerometer 100, plus any desired repeats of sending an LF signal to obtain distance data, enables the use of increasingly accurate or complex target patterns.

Radar recognizes a movement pattern at close predetermined distance. Radar data can be received via an added module 9 sending signals through radar transmitters and receivers 14. Multi-point transmissions of a radar scan and multi-point reception of the return reflections at the variety of radar reception antennas 14 enables detailed detection of even individual movement of an arm or leg of the target person. Areas of interest for placement of radar antennas 14 are the front fenders, the side doors, the rear fenders, the tailgate, and the rear skirt. Radar antennas 14 can be provided in multiple positions to detect movement with more or less precision. At least one and often as many as four or more are desired for precise recognition. As an example, a delivery van would need four to recognize a user at key locations. These locations would be by the driver's door, side door, rear door, or inside the cargo compartment. The spacing between multiple radar antennas also adds accuracy.

In triggering mode, the tag 12 and ECU 7 communicate to recognize a specific movement by a targeted person or object, which typically corresponds to movement of a targeted human carrying the tag, such as a user 15 or a user 16, who apparently are in possession of the tag. Radar can monitor any mass in its field, whether carrying a tag or not. Thus, references to a target, a targeted tag, or a targeted object, user, person or human all can refer to a target of radar unless used in context where specifically differentiated. The radar device will use higher frequency, radar bandwidth, to both track the target 15, 16 and to trigger certain function(s) in or about the car.

In a primary authorization, the ECU 7 wakes up and authenticates or recognizes the presence of a target key tag using LF technology. After such wake up and recognition, the ECU 7 tracks the target 15, 16 and recognizes a specific action by a target 15, 16 optionally using higher frequency radar technology. Such higher frequency triggers certain programmed responses or function(s) in the car 11 or in proximity thereto.

In greater detail, an authorization controller 8 engages in an authentication process. The ECU and authorization controller 8 may be physical parts of a single electronics base station 10 performing both functions, or they may be physically separate units. While for aftermarket installations the combined units are preferred, for OEM installations the vehicle's original equipment may separately provide an authorization controller 8 elsewhere in the vehicle network. Initially, as a tag is brought nearer to a car and into a mutual recognition zone, a low frequency (LF) process is engaged to recognize the approach by a user 15, 16. Then, an LF electromagnetic field generated from the ECU 7 wakes the tag 12. A receiver/transmitter inside the tag 12 is turned on to communicate via RF frequency with the first side of the system or ECU installed in the vehicle.

RF communication between the tag 12 and ECU 7 is used to perform a zoning function to determine the approximate location of a user 15, 16 and to enable a logic decision of when to activate radar unit 9, which also may be a physical part of electronics base station 10 or a separate unit. The radar unit 9 is in a sleep mode or low power mode until it is commanded to wake up. Radar is selectively applied only as needed according to software control, often depending upon the function to be carried out, such as when an authorized user has been detected in the proximity and the radar must detect a tracking pattern where movement of individual limbs may be required. When the radar 9 wakes up, it scans for patterns of movement by any object in its field. The second side of the system activates a radar transmitter and receiver 14 installed in the car. Both Coherent pulse and Doppler radar waveform have the ability to track targets in motion and to determine the presence of stationary objects. The first side of the system uses a chosen radar waveform to look for a pre-programmed pattern of target movement, illustrated in FIG. 1 by the example of a step pattern 17 performed by the target 15. A unique suitable pattern is described as "step in, wait, step out." This pattern is native to a user approaching and then opening a tailgate 19 or door 21 even without having this invention installed. After approaching, the user enters a pause or wait state and then must follow up with action to open the tailgate 19 or door 21. Such an action might be to press an actuator button 20, after which the user steps back to allow the tailgate 19 or door 21 to open. Thus, the "step in, wait, step out" pattern is met as user 15 steps forward to foot prints 17, pauses, and steps back.

The radar waveform monitors the body mass in front of it. It is capable of detecting and separately reporting pattern movement in three dimensions, as precise as two separate leg movements of a targeted human person. The pattern is software driven. Recognizable patterns include a kick, step-in-step-out, or step one foot forward. For example, it has been found that with suitable software programming, the radar readout can be distinguished to identify one leg making a step forward while a second leg stays still behind the first leg. The radar readout shows this by different peaks in amplitude at different distances. Another preprogrammed pattern of the radar sensor can be a kick motion as suggested by the forward leg kick of target 16. In a variation, the target steps and holds one foot forward, such as for target 16 to step onto foot print 18. Where a progressive motion is being controlled, the programmed pattern can be for the target to keep the foot on step print 18 until a desired degree of progress is complete, such as for an accessory to reach a certain height or degree of opening. The progress is stopped by retracting the foot. A second example would be a truck having a motorized tonneau cover where the tonneau motor is activated to open the tonneau cover by the user striking a foot forward stance to a location suggested by step print 18 and stopped by retracting the foot.

When a radar readout shows a body mass movement that matches a pre-programmed movement, it sends a command to the ECU 7 to perform a certain correlated function, such as to signal for an opened liftgate, roll a sidestep up or down, open a tonneau cover, open a side door, or the like. Software customization is possible to allow a user to pick a desired predetermined pattern with setting up a delay or an order of openings based on individual preferences. A preferred tool for customization is a webpage on the Internet dedicated to reprogramming, where the user can select from listed choices of functions and patterns. A reprogramming output can be prepared and downloaded to the ECU. A smartphone, thumb drive, or wife can be used as a carrier to bring the reprogramming to the ECU.

Another example of functionality is triggering a sliding door to open, such as the doors present on delivery service vans. A "kick" motion also is appropriate to activate electronic factory or aftermarket features such as a side step running board, where the "step in, wait, step out" pattern is less natural. The advantage of using a radar-based system is that it both detects and monitors in three dimensions on an ongoing basis, whereas prior capacitive systems were limited to detection of an interruption in the capacitive field. With three-dimensional operation, the user may trigger an action without necessarily entering or closely approaching a capacitive field. Thus, in FIG. 1, the users 15, 16 are not limited to leg actions. Another action that is detectable by a radar system is raised arms as shown in FIG. 1, even though the arms are above the traditional level of a capacitive field. Choices such as raising an arm or placing a leg forward are of particular advantage because these can be stable poses that are both convenient to the user and capable of being held over a long term to enable a progressive action.

The invention can employ a known pattern in conjunction with an automated function, implementing a hands-free option by physically or logically pressing an actuating button for the user, leaving unaltered the natural pattern of "step in, wait, step out." This precise pattern is recognized to activate an associated action from the ECU 7, such as opening or closing the tailgate 19 of the car 11. The same radar technology can be used with different programmed movement patterns to trigger the opening/closing of side doors 21, opening/closing of regular doors, deployment of a handicap ramp, or other chosen functions that can be initiated by electronic response.

An optional secondary authentication can be made of the target person's factory-supplied or otherwise non-LF key fob. Secondary authentication follows recognition of the target person's pattern of movement 17, 18 as matching a pre-programmed pattern. A factory fob can be used as authentication for the user 15, 16. Once authenticated, the above-described technology is used to perform the pre-programmed action, such as to open the tailgate 19.

The ECU 7 can trigger certain functionality in the car based on the target's approach and departure, rather than requiring a routine of a step pattern. LF technology can be used to detect distances and to determine approach and departure with respect to a target. Without limitation, suitable responsive functions are to trigger any chosen electronic accessory in the vehicle, such as activate motorized steps that perform a drop and pull action, starting or stopping the vehicle motor, turning on vehicle heat or air conditioning, turning on welcome lights, or extending a handicap entry ramp.

Figure 3:
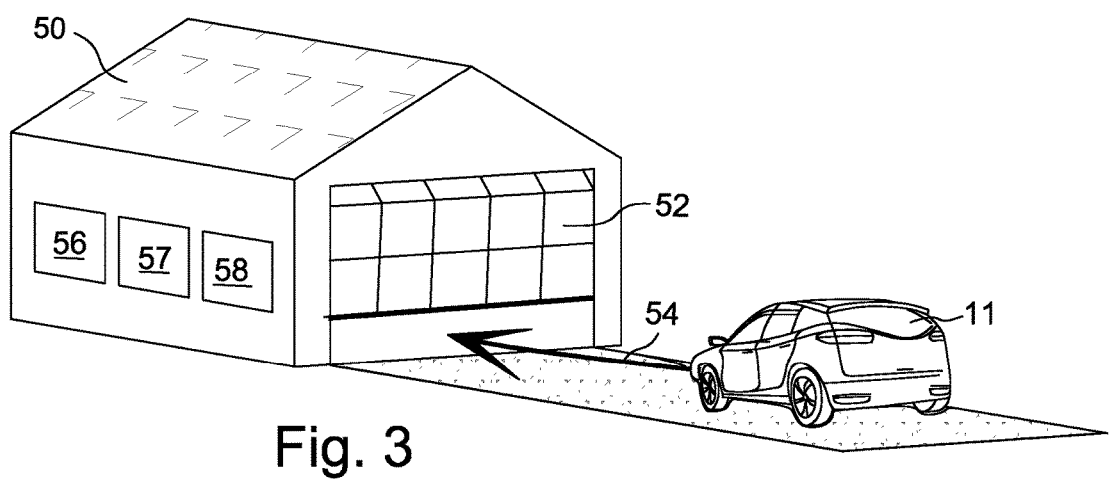
FIG. 3 is a perspective view showing a representative car approaching a garage with operation of the garage door.

FIG. 3 shows a further functionality that is a hands-free operation of a remote piece of operable equipment. An example is touchless garage door operation during arrival or departure of a vehicle, thus opening or closing the power door. Further examples are operation of lights, locks, appliances or hvac equipment in a house. In each case, operable equipment is operated using a control that is responsive to a signal from a control unit such as an ECU. A multi-way control or multiple controls can allow two or more different actuations, such as a direction of operation chosen by the control unit. Thus, a garage door might be raised or lowered, and a piece of household equipment might be turned on or off or adjusted between multiple selected settings. This application will be described in connection with a garage, with the understanding that other remote equipment can be operated similarly.

A significant part of the invention is that remote equipment is operated either exclusively or with corresponding operation of a functionality of the vehicle. A first-side-ECU 7 and a remote or second-side-ECU 56 can communicate, such as sharing distance of an approaching vehicle 11 from the second-side-ECU or other arrival point. The stationary location such as garage 50 is equipped with a local or second-side-ECU 56 with processor and memory, an optional local or second-side-authentication controller 57, and a local or second-side-tag 58. Instead of the target carrying a tag and approaching within the mutual recognition zone as previously described, the car 11 carrying the first side of the system or first-side-ECU 56 with its built-in recognition zone approaches a second-side-tag 58 or multiple tags that are stationary. The purpose of the second-side-tag 58 remains to aid in establishing the mutual recognition zone and distance between a vehicle and target. These second-side-tags 58 are installed inside or near a garage 50 and have an associated second-side-ECU 56 with a memory record of pattern and functionality. Tags 58 can communicate with the vehicle as well as with each other, creating a mesh network. The local second-side-ECU 56 receives data from the local second-side-tag 58 and the first-side-ECU 7 and determines operation of garage door 52, as an alternative to conventional manual operation of a wall mounted operating button. The car 11 approaches the garage 50, indicated by arrow 54. A first-side-ECU 7, FIG. 1, installed in the car 11 might generate a distance measuring field 13, FIG. 1, such as an LF electromagnetic field, near the second-side-tag or tags 58. The LF field detects a disruption and, where the tag 58 is in a sleep state, wakes the second-side-tag 58. The disruption in the LF field turns on a receiver/transmitter associated with the second-side-tag 58 in the garage 50 to communicate, such as via RF, with a first-side-ECU 7, and this first-side-ECU 7 triggers second-side-tags 58 to communicate within the mesh network. Multiple second-side-tags 58 near the garage and multiple antennas in the vehicle 11 enable determination of the precise location of the car 11 relative to the second-side-tag 58. The second-side-ECU 56 determines a logical decision to open or close the garage based on this information. An accelerometer or radar sensor installed on the vehicle 11 and/or the garage 52 can assist in determining position of the vehicle 11 to avoid garage door jamming.

While the description mentions transmissions at chosen frequency bandwidths and a wake-up function, these bandwidths and function are not essential where the second-side tag 56 is at a location where it need not rely on a mobile battery for power. The availability of grid power can allow continuous full operation by the second-side-tag 56. The use of a wake-up function and broadcast of LF frequency to determine distance in a mutual recognition zone remains useful and more secure, although substitution of other distance measuring technology also is suitable.

Automatic garage opening or closing is enabled using this broadly functional, unified technology to replace specialized, function specific technology previously practiced. A garage door opener is representative of functionally controlled equipment located outside or distant from a vehicle. The localization function determines the vehicle's proximity to the garage, which strongly contributes to the decision of whether to open the garage door. The second-side-ECU 56 in the garage can be programmed to also handle a situation where the vehicle 11 is parked inside the garage 50 and the driver possibly is prepared to leave the garage. In this case, the localization function determines that the vehicle is inside the garage 50 and the garage door 52 is closed. A triggering pattern for opening the garage door might be localizing the driver to a position outside the car 11, plus opening the driver's side door. Responsive functionality might be to start the car and to open the garage door. Should the vehicle 11 be started or engaged in gear without a detected opening of the garage door, the second-side-ECU may signal the driver that the garage door is shut and may initiate other precautions to prevent the vehicle from striking the closed garage door, such as by shutting off the vehicle or otherwise locking the vehicle from movement until the situation is resolved. Once the locating function determines that the vehicle has fully exited the garage, the first-side-ECU can communicate with the second-side-ECU to close the garage door or to signal the driver with an option to close the garage door. Available data entering the logical decision by the second-side-ECU may include data beyond what is derived from local sensors. The factory network installed in the vehicle is an example of an outside or independent source of vehicle status data. Without limiting the scope of available data, vehicle status might include whether the car is moving, parked, running, door status, and speed.

A garage controller is not limited to operating the garage door. A second-side-tag and second-side-ECU installed in the garage can be configured to communicate with an optional tag module inside a house. The module may be connected to a local network or wifi to send notifications to a user's phone or to communicate with "smart home" equipment. Suitable functions within a house might be turning on/off house lighting or appliances or locking doors.

Figure 2:
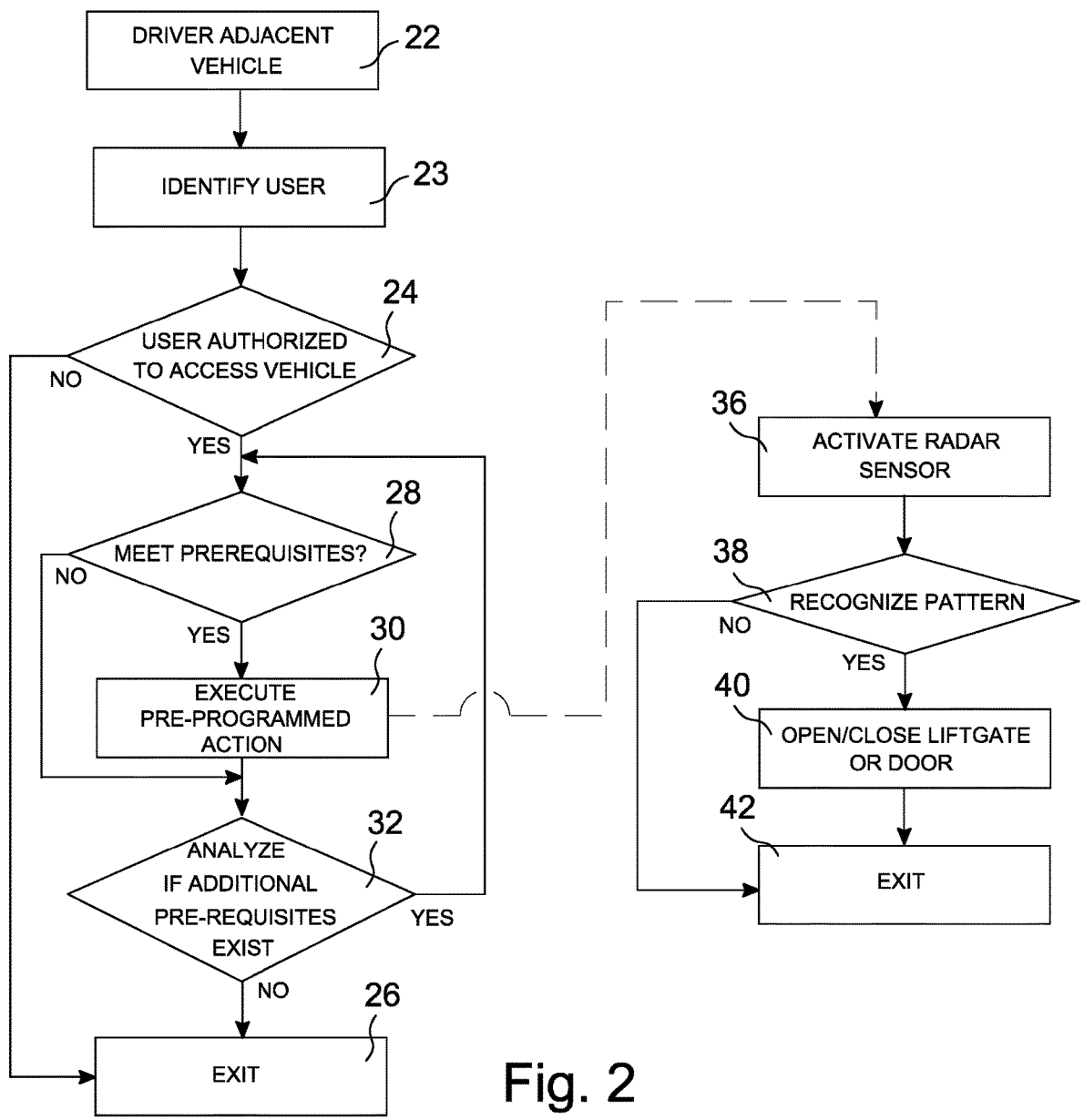
FIG. 2 is a schematic flow chart of program steps for carrying out an operation of the invention.

With reference to FIG. 2, logical sequences between the ECU and key fob can follow a sequence. At step 22, the driver approaches the car. At step 23, the tag is detected and identified. At step 24, an authorization controller determines whether this driver or tag is authorized to access the vehicle. If the answer is "no," the sequence ends at exit block 26. If the answer is "yes," then at block 28 access using the detected tag is further analyzed for adequacy. If "yes," then a pre-programmed action is undertaken at block 30. Non-limiting examples of pre-programmed actions are turning on lights, locking the car, or unlocking the car. If block 28 is "no," then the program skips to block 32 to check for additional pre-requisite information. If "no" at block 32, the program ends at exit block 26. If "yes" at block 32, the program returns to block 28 for redetermination of whether prerequisites are met. Eventually either the pre-programmed action is executed or the sequence ends.

An example of a pre-programmed action is to open a liftgate or door. Where a "yes" was realized at block 28, block 30 starts a routine for carrying out an action by activating a radar sensor at block 36 to watch movement of the target person. Patterns of movement are monitored for recognition. Where a pattern is recognized at block 38, and the pattern is associated with opening or closing a liftgate or opening a door, the routine advances to block 40 to open or close the liftgate or open a door. Upon completion of this action, the routine exits at block 42. Where a pattern is not recognized at bock 38, the routine finishes or exits at block 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A two-sided system for triggering a selected functionality of a piece of operable equipment when monitoring a mutual recognition zone of said two sides, initially detecting a target tag in said mutual recognition zone and subsequently detecting a target human, and recognizing at a first side of the two-sided system a known triggering pattern for said selected functionality performed by said target human, comprising:

said first side of the system having an electronic control unit (ECU) mountable to said piece of operable equipment, and the first side of the system further having a memory with a record of said known triggering pattern and said selected functionality;

said target tag comprising a mobile tag in said second side of the system, capable of exchanging communication with said ECU when within said mutual recognition zone;

said two-sided system being functional to detect the target tag when within the mutual recognition zone and to make an approximate initial determination of distance between the target tag and the piece of operable equipment based upon exchanged communication between the target tag and the ECU;

the two-sided system further comprises an accelerometer configured to monitor the target tag and to perform inertial navigation thereof, wherein the ECU controls the inertial navigation to be activated after the system has detected the target tag within the mutual recognition zone, the accelerometer employing inertial navigation to determine inertial navigation data and to communicate said inertial navigation data to the ECU, enabling determination of at least position, orientation, and velocity of the target tag in the mutual recognition zone, the first side of the system further comprises a radar module having a sensor transmitting a radar scan into a radar field proximate to the piece of operable equipment and a sensor receiving back a reflection of said radar scan, the scan using a frequency suitable to detect a human target or portion thereof and a stationary object, if any, and suitable to reflect back therefrom, whereby said human target or portions thereof and stationary object are detected without necessity of combined location with the target tag; wherein the radar module generates radar data indicative of distance to the detected human target or portion thereof and stationary object, and the radar module communicates the radar data to the ECU;

the ECU having a receiver for receiving said inertial navigation data and radar data, the ECU further having an ECU processor communicating with said memory to determine when the inertia navigation data and radar data shows that the monitored human target has performed the known triggering pattern, and in response thereto the ECU issuing a triggering signal; and wherein said first side of the two-sided system is connectable to said piece of operable equipment such that the triggering signal triggers the selected functionality.

2. The two-sided system of claim 1, wherein said portions of said human target comprise separate limb movements of the human target.

3. The two-sided system of claim 1, wherein said radar module is programmed to detect said triggering pattern by said detected human target, wherein the triggering pattern is selected from the group consisting of "step in, wait, step out," kick, or "step and hold."

4. The two-sided system of claim 1, wherein said piece of operable equipment comprises a land vehicle having functional equipment selected from the group consisting of a tailgate, a side door, an extendable step, a light, and a ramp, and said selected functionality is chosen from the group consisting of operating said tailgate, operating said side door, extending said step, operating said light, or deploying said ramp.

5. The two-sided system of claim 1, wherein said piece of operable equipment comprises a car and said detectable human target is a human carrying said tag.

6. The two-sided system of claim 1, wherein:
said memory is programmable for a user-selected record of triggering criteria and selected functionality.

7. A method of triggering a selected functionality of a piece of operable equipment in a two-sided system of communication, operable within a mutual recognition zone by detecting performance of a known triggering pattern for said selected functionality by a detected human target, if any, comprising:
providing at a first side of said two-sided system an electronic control unit (ECU) having a memory with a record of said known triggering pattern and the selected functionality;
providing at a second side of the two-sided system a mobile tag capable of exchanging communication with said ECU within said mutual recognition zone;
initially determining a distance between the mobile tag and the piece of operable equipment by analysis of said exchanged communication between the mobile tag and the ECU;
subsequent to said initial determination of distance, applying inertial navigation to the mobile tag to determine inertial navigation data, and communicating said inertial navigation data to the ECU, enabling determination of at least position, orientation, and velocity of the mobile tag in the mutual recognition zone;
providing a radar module on the first side of the two-sided system, positioned to provide radar data of detection and tracking of a human target, if any, and a stationary object, if any, in a radar field proximate to the piece of operable equipment and in the mutual recognition zone, wherein said radar module employs waves of a tracking frequency suitable to detect said human target by striking the human target and reflecting back therefrom;
actuating the radar module to emit waves at said tracking frequency to the radar field to detect the human target therein, if any;
receiving reflection of said emitted waves from the detected human target, if any;
communicating said radar data to the ECU;
the ECU combining inertial navigation data and radar data to determine possible performance of the known triggering pattern by the human target;
wherein when the ECU determines the known triggering pattern has been performed, issuing a triggering signal to the first side of the two-sided system;
triggering the selected functionality.

8. The method of claim 7, wherein when activated, said radar module emits a waveform chosen from the group consisting of Coherent Pulse and Doppler radar waveform.

9. The method of claim 7, wherein said triggering pattern by said human target is selected from the group consisting of "step in, wait, step out," kick, or "step and hold."

10. The method of claim 7, wherein said step of detecting performance of the triggering pattern by human target is performed by inertial navigation.

11. The method of claim 7, further comprising:
maintaining a user programmable memory of a user-selected triggering pattern and an associated functionality.

12. The two-sided system of claim 1, wherein said sensors for transmitting and receiving radar waves are plural in number and are located in multiple spaced apart positions on said piece of operable equipment.

\* \* \* \* \*